United States Patent
Carlsson

[15] 3,659,812
[45] May 2, 1972

[54] PATH HAVING VARIABLE RESISTANCE TO VEHICLES MOVING ON IT

[72] Inventor: Sixten Einar Carlsson, Norrkoping, Sweden

[73] Assignee: Borgs Fabriks AB, Norrkoping, Sweden

[22] Filed: Sept. 24, 1970

[21] Appl. No.: 75,168

[30] Foreign Application Priority Data

Dec. 1, 1969 Sweden................................16482/69

[52] U.S. Cl. ..............................................244/114 R, 94/7
[51] Int. Cl. ..........................................................B64f 1/02
[58] Field of Search ..................244/114 R, 110 A; 94/27, 7, 94/4; 188/268

[56] References Cited

UNITED STATES PATENTS 3,066,896  12/1962  Schirtzinger .......................244/114 R

FOREIGN PATENTS OR APPLICATIONS 742,240  12/1955  Great Britain .....................244/114 R

*Primary Examiner*—Milton Buchler
*Assistant Examiner*—Paul E. Sauberer
*Attorney*—Munson & Fiddler

[57] ABSTRACT

A runway or landing surface for vehicles and particularly aircraft, such surface including a casing or enclosure containing granular material, the casing being connected to means for producing a vacuum within it to an extent to cause compaction of the granular material in order to produce a hard landing surface, and means for breaking or reducing the vacuum or its effect when a soft surface is desired to thereby result in resistance to forward movement of the aircraft or other vehicle.

8 Claims, 4 Drawing Figures

Patented May 2, 1972

3,659,812

SIXTEN EINAR CARLSSON
INVENTOR

BY
MUNSON & FIDDLER
ATTORNEY 3,659,812

PATH HAVING VARIABLE RESISTANCE TO VEHICLES MOVING ON IT

BACKGROUND OF THE INVENTION

The present invention is adapted for use in connection with paths traversed by all types of wheeled vehicles but is primarily intended for use in connection with aircraft runways.

Occasions often arise where, for one reason or another, an aircraft is unable to stop under the power of its own brakes within the runway space available. Consequently, runways are often equipped with aircraft arresting gear, in the form of devices anchored to the ground and adapted to arrest the forward movement of the aircraft bringing the aircraft to a stop within a relatively short distance. Generally, there are two different kinds of aircraft arresting means. One of these is the net barrier, the aircraft being caught in a net, which folds itself around the aircraft, the braking effect being achieved by means of energy-absorbing devices connected to both ends of the net. A second type includes an arrester hook on the aircraft, which catches in a steel wire stretched transversely across the landing path. The hook carried by the aircraft, engages the wire, the ends of the wire being connected to energy-absorbing devices.

Both of these barriers have certain advantages and disadvantages. One advantage afforded by the net barrier is that the aircraft need not be provided with an arrester hook, thereby saving considerable weight as compared to an aircraft provided with a hook. On the other hand, the barrier net makes possible certain forms of damage to the aircraft when arresting the movement thereof. This often results in expensive repair work. As distinguished from this, the arrester hook has an advantage whereby damage is not often caused to the aircraft, although it does possess the disadvantage whereby the weight of the aircraft is increased. This is a serious disadvantage both with respect to military and to civil aircraft. A further disadvantage of the net barrier is that it is only suited to jet propelled aircraft since aircraft provided with propellers cannot, in principle, use the net barrier.

The present invention has all of the advantages of the forementioned types of aircraft barriers and lacks their disadvantages. The arrangement of the present invention requires no special equipment to be installed on or in the aircraft. No damage is caused to an aircraft when arrested by the means of the invention, and said means is both suited for jet propelled and propeller aircraft. Furthermore, the invention provides calculated braking assistance for aircraft which vary widely in weight and undercarriage geometry, whereby braking is neither too abrupt nor too gentle.

The invention is based on a physical phenomenon which occurs when a particular material such as a granular material is enclosed in a sealed and flexible casing, in which different degrees of vacuum can prevail. In the absence of a vacuum, that is when there is no pressure difference between the inside and outside surfaces of the basing, the filling material has full freedom of movement, while if there exists a difference of pressure across the casing wall so that the pressure on the inside is lower than the pressure on the outside, the flexible wall of the casing compacts the granular material enclosed in the casing, thereby limiting its freedom of movement proportionally to the difference in pressure in a manner, in the case of a high vacuum, the granules are practically unable to move at all. This physical effect is caused by the fact that when the casing is compressed as a result of the vacuum, the granules are urged together in a manner whereby the friction acting between them prevents them from moving.

A system based on this physical effect and the casing of which has a width generally equal to the width of the runway or path and presents a smooth upper surface whereby the casing forms a smooth continuation of the runway proper, obtains when subjected to a high degree of vacuum, that is, up to 1 atmosphere pressure difference, a degree of hardness in the same order of hardness as that of the runway, thereby permitting aircraft and other vehicles to move along the same exactly as though they were moving on the actual runway. If, however, atmospheric air is allowed to enter the casing, the pressure difference is reduced and therefore the force compacting the granules, whereby the granules are able to move more easily and the surface becomes softer, which means that the wheels of the aircraft or vehicle deform the casing to a corresponding degree, thereby causing an increased resistance to rolling.

In the absence of any pressure difference whatsoever, and with a fully flexible casing wall, the effect is essentially the same as if the wheels were moving in the filling material itself, the result is a radically increased tractive resistance, and tests have shown that the resulting increase in retardation of the aircraft or other vehicle over and above that provided by its own braking system is of the order of 8–12 m/sec$^2$ with suitable filling material, suitable casing material and at the specific wheel pressure common with aircraft, for example.

DESCRIPTION

In the accompanying drawing, wherein an illustrative embodiment of the invention is disclosed, FIG. 1 shows a portion of a path or runway in longitudinal section and in which the invention is embodied;

Figure 1:
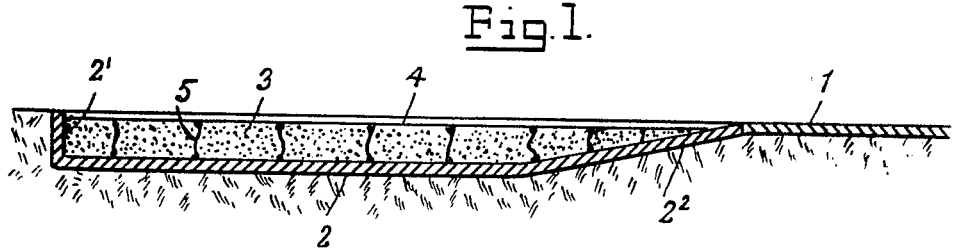

In connection with and beneath appropriate longitudinal portions of a conventional path or runway 1 is arranged a sunken foundation or depression formed by a supporting surface 2, which together with side-defining surfaces or walls 2' and a covering comprising a flexible mat 4, form a hermetically sealed casing or chamber having the same width as the width of the normal path or runway, and presenting a flat upper surface. The initial portion of the sunken foundation 2' is inclined and merges gradually with the normal path 1. Enclosed in the casing or chamber thus formed is a granular filling material 3. Such material may consist of sand, gravel or any other suitable hard granular material.

Figure 3:
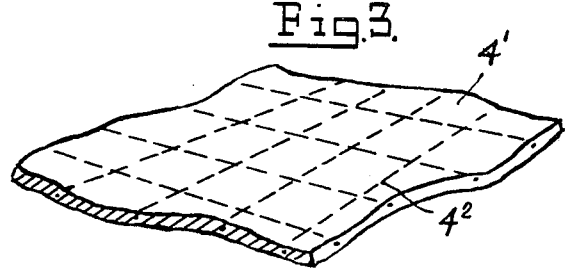
FIG. 3 is a perspective view of a portion of the casing.

In FIG. 3 is shown how the flexible mat or covering 4 can be formed. The basic material for the mat can be for example, rubber or plastic material 4' reinforced with a network or mesh of steel wire 4$^2$ in a manner whereby flexibility of the basic material of the mat is retained.

Figure 4:
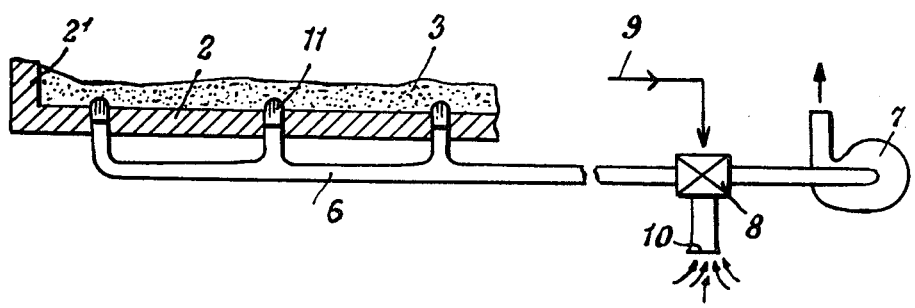
FIG. 4 is a diagrammatic view showing a vacuum means for the system.

FIG. 4 illustrates diagrammatically a system of conduits 6 connected to the closed casing at a suitable number of points distributed over the bottom surface of the casing, filters or strainers 11 being provided to prevent the granular material from entering the conduits. One or more vacuum pumps 7 are connected to the system for evacuating the casing. Also connected in the conduit system 6 is a valve means 8, adapted to close the system from atmospheric air and which is controlled by a signal operating through a line 9, to open the conduit system 6 during certain periods, through an air intake 10, in a manner by which the degree of vacuum in the casing can be reduced to a value corresponding to the operating signal.

Figure 2:
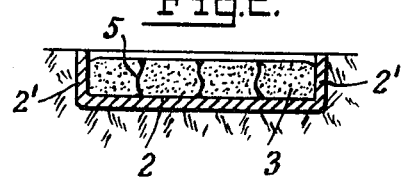
FIG. 2 is a cross-sectional view taken substantially on the line II—II of FIG. 1.

In FIGS. 1 and 2 is shown how the covering mat 4 has arranged at a suitable number of points over its surface, flexible connections 5, joining the mat to the sunken foundation or base 2, for the purpose of preventing excessive horizontal movement of the mat while retaining a certain freedom of vertical movement.

The operation of the described invention is substantially as follows:

Normally, all air is evacuated from the casing, and hence the top surface of the same is smooth and is very hard. Aircraft are therefore able to run unhindered on the upper surface of the casing as on a mat, without the casing being deformed. Aircraft are even able to land, that is, settle with their wheels on the surface, without any negative effect. Located in the vacuum system which has previously evacuated the air from the casing are regulable valves which permit air to enter the casing during certain, predetermined periods of time. The time periods are determined by the different parameters of the aircraft such as the weight of the aircraft, the normal lift coefficient of the aircraft in its moving attitude and the geometry of the undercarriage. When a critical situation seems apparent, that is when there is a risk that an aircraft will not be able to stop within the runway space available under its own braking system, the regulating valves are opened upon a signal from air traffic control for that period of time which provides a degree of vacuum corresponding to the combination of the forementioned aircraft constants. This provides the system with a degree of softness which results in an increased tractive resistance of such magnitude that maximum braking assistance is given, without increasing said resistance to such an extent that there is danger of a ground accident.

What is claimed is:

1. A system for use with paths used by aircraft or other vehicles whereby, when desired, a braking effect can be exerted in addition to the braking effect obtained with the usual braking system of the vehicle, the path having a surface material such as sand, gravel or similar granular material enclosed in a hermetically sealed enclosure; said enclosure being connected to vacuum-producing means by which the enclosure is air-evacuated when a firm surface is required, the material being then compacted and becoming solid, and when an increased resistance to rolling is desired the vacuum is broken so that the material becomes deformable.

2. A system according to claim 1, wherein the surface material is contained in a recess in the path, the casing consisting of walls of the recess and with a mat covering the walls and the surface material.

3. A system according to claim 2, wherein the mat comprises flexible material such as rubber or plastic reinforced with a material of high mechanical strength, said reinforcement being made flexible by being formed of a steel wire network structure.

4. A system according to claim 1, wherein the upper portion of the casing situated in the plane of the path is connected at a number of positions with underlying stationary portions of the path by means of flexible connecting means of such length that horizontal movement of the upper path portion is restricted.

5. A system according to claim 2, wherein the recess is located in a path of known construction and in a manner whereby the bottom of the recess is connected to the path by a sloping bottom portion.

6. A system according to claim 1, wherein a system of conduits connects with the casing and vacuum pumps, the conduits being provided with shut-off valves.

7. A system according to claim 6, wherein, in addition to the shut-off valves, the conduit system is also provided with valves for regulating the entry of atmospheric air into the casing so that, when required, a lower degree of vacuum can be immediately obtained.

8. An aircraft runway having a depression provided with a bottom surface, a covering composed of a reinforced flexible material above the depression, the covering and bottom surface defining a closed space containing a granular material, means for creating a vacuum is said space to result in compaction of the granular material and produce a hard surface for a vehicle to traverse, and means for reducing the vacuum to soften said surface and produce tractive resistance to a vehicle passing over it.

* * * * *